United States Patent
Toutain et al.

(10) Patent No.: US 6,341,134 B1
(45) Date of Patent: Jan. 22, 2002

(54) PROCESS FOR THE ARRANGEMENT OF EQUITABLE-LOSS PACKETS

(75) Inventors: Francois Toutain, Thorigné-Fouillard; Maher Hamdi, Tunisia; Pierre Rolin, Palaiseau, all of (FR)

(73) Assignee: France Telecom SA, Paris (FR)

( * ) Notice: Subject to any disclaimer, the term of this patent is extended or adjusted under 35 U.S.C. 154(b) by 0 days.

(21) Appl. No.: 09/034,371

(22) Filed: Mar. 4, 1998

(30) Foreign Application Priority Data

Apr. 23, 1997 (FR) .............................................. 97 05239

(51) Int. Cl.⁷ .............................................. H04L 12/28
(52) U.S. Cl. ........................................ 370/412; 370/468
(58) Field of Search ................................. 370/412, 413, 370/415, 417, 418, 428, 429, 235, 229, 468, 230

(56) References Cited

U.S. PATENT DOCUMENTS 5,400,329 A * 3/1995 Tokura et al. ............... 370/232
5,748,614 A * 5/1998 Wallmeier ................... 370/235

* cited by examiner

Primary Examiner—Huy D. Vu
Assistant Examiner—Alexander D. Boakye
(74) Attorney, Agent, or Firm—Laff, Whitesel & Saret, Ltd.; J. Warren Whitesel

(57) ABSTRACT

A system and a process arranges equitable-loss data packets in a high-volume asynchronous transfer mode (ATM) system and establishes the output order of the packets. There are a plurality of inflowing data packet streams, a minimum quantity $r_i$ of each incoming flow being reserved. At all times, there is a ratio $K(t)$ between two parts of each incoming data packet flow. One part is a quantity of packets $\Delta x_i(t)$ allocated above the minimum reserve quantity $r_i$. The other part $e_i(t)$ is an instantaneous quantity $\Delta x_i(t)$ above the minimum reserve quantity $r_i$.

11 Claims, 1 Drawing Sheet

PROCESS FOR THE ARRANGEMENT OF EQUITABLE-LOSS PACKETS

The invention relates to a process for the arrangement of equitable-loss packets. Such a process is particularly applicable in a high-volume integrated services network using the ATM (Asynchronous Transfer Mode) technique. In such a network, which is of the packet switching type, the packets have an interacting connection with the packets from other connections at each node at which a switching element would normally be located.

BACKGROUND OF THE INVENTION

Such networks are designed to allow for communications between applications which call for performance values from the said networks which are becoming constantly more demanding in terms of routing times, jitter (service time variation), packet loss, minimum volume etc.

Traditional packet switching networks are of the type known as best effort; that is to say, they do not provide guarantees of service. The philosophy behind this type of network is that the intelligence is concentrated in the applications, while the network itself is as simple as possible. The result is that, in the event of the network being overloaded, performance values may deteriorate to a substantial degree, which may lead to a significant loss of packets. In addition to this, the joint presence of applications requiring different qualities of service calls for their having a homogeneous type of behavior with regard to congestion, in other words, they are required to obey a rule of reduction in their volume, at the risk of leading to situations in which certain more "aggressive" applications are accordingly favoured, and take up the larger part of the bandwidth, to the detriment of more conservative applications (those which tend more to obey the behavior rule). There is the risk of this phenomenon becoming all the greater, the greedier the applications become in the bandwidth. It accordingly appears unlikely that several audio and video applications are capable of existing together in harmony.

To resolve these problems, a number of arrangement procedures have been applied which allow for a command to be implemented to determine the order in which the packets deriving from different connections will be served. These procedures are referred to as "equitable", because, when linked to conformity and admission checks, they make it possible to guarantee that a given fraction of the bandwidth of a node is explicitly dedicated to a particular connection. Such a guarantee of volume, extended to all the nodes of a give channel, forms the essential basis for the provision of more sophisticated service guarantees with regard to service time, jitter, or even losses. In a similar way, its relaxation provides the opportunity to improve the use of the network by providing a statistical commitment with regard to the quality of the service supplied.

Accordingly, during the establishment phase of the call, a request relating to the characteristics of the anticipated traffic and performance values is issued. A group of admission check conditions for the connection is tested at each node in the network. The new connection is then accepted by the network if the network resources available are sufficient to satisfy the request for the connection without disturbing existing connections. The network accordingly guarantees that the performance values required will be respected, provided that the subscriber respects the traffic characteristics.

A process for establishing of order is implemented at each node in the network, and consists of determining which packet is to be served for transmission by discriminating between the packets on the basis of the traffic characteristics of their performance requests.

A first establishing of order process known under the service name of "First In, First Out" (FIFO) makes use of a queue for each output link of a network node, in which the incoming flows are multiplexed.

In the context of the FIFO process used in the traditional manner, Demers et al and Parekh and Gallager have jointly proposed another process known as Generalised Processor Sharing Discipline, or GPS discipline. Descriptions of this process have been given, on the one hand, in the article which appeared in the Journal of Internet Working Research and Experiment, October 1990, pages 3 to 26, and entitled "Analysis and simulation of a fair queuing algorithm", and, on the other, in another article which appeared in the journal Proceedings of IEEE of Infocom, pages 914 to 924, 1992, entitled "A Generalized Processor Sharing Approach to Flow Control in Integrated Service Networks - The Single Node Case". The basic principle of this process is summarised hereinafter.

Given a collection of weightings $r_1 \ldots r_N$ associated with the flows $1, \ldots N$. A node implements the GPS discipline, being given two instants s and t, if the quantities of data $W_i(s,t)$ and $W_j(s,t)$ serving for two flows i and j active between s and t are such that:

$$\frac{W_i(s,t)}{W_j(s,t)} = \frac{r_i}{r_j} \qquad (1)$$

A flow is active between s and t is at least one packet o the said flow is present in the queue or is in the course of service between the instants s and t.

The weightings $r_1$ to $r_N$ are directly proportional to the quantities allocated respectively to the connections 1 to N. Such an establishing of order process may also be considered as equitable in the sense that it allows for the division of the output capacity in precise proportion to the weightings and therefore of the quantities allocated to the different flows.

It is likewise considered that the relationship indicated above defines a fluid model. In fact, if the hypothesis of fluid flow is adopted, it is possible to serve traffic units as small as may be desired, or, likewise, to serve all the flows in parallel. As a result, it is possible to divide the service into precise proportions of the weightings of the flows, at any time. Nevertheless, the problem posed by a fluid model is that of its implementation in the context of flows consisting of packets.

Equation (1) may be rewritten in the form:

$$\frac{W_i(s,t)}{r_i} = \frac{W_j(s,t)}{r_j} = q(s,t)$$

The quantity $q(s,t)$ is referred to as the normalised quantity. For a flow k, this quantity is generally annotated.

$$w_k(s,t) = \frac{W_k(s,t)}{r_k}.$$

This can be written as $q(s,t)=v(t)-v(s)$

The function $v(t)$ represents the development over time of the function $q(s,t)$, and is known as the virtual time function of the system. The virtual time defined in this manner increases in step with the growth of service in the system. It can be shown that v(t) is an incrementing string function, linear in the form of fragments, of which the slope at any moment t is inversely proportional to the sum of the weighting of the flows which are then active.

In current networks, one single flow is served at a given moment, and this service corresponds to the transmission, which cannot be pre-emptied, of a data packet of variable size. As a result of this, it is necessary to approximate the fluid model described above by a mechanism which manipulates the final entities such as the packets, while still approaching as closely as possible to the "ideal" equability of the fluid model. The general principle of known forms of implementation, referred to as fair queuing, and known without distinction as PGPS (Packetized Generalized Processor Sharing) or WFQ (Weighted Fair Queuing) is based on the marking of the packets entering with the aid of the virtual time function of the server, and their insertion in a queue which is selected on the basis of the incrementing markings. The packet selected for transmission is then the first packet in the queue.

SUMMARY OF THE INVENTION

The objective of the invention differs from that of the fluid model described above. It is in fact possible to distinguish between three types of guarantees which must be offered to the user of an adaptive application. The first guarantee relates to the volume. In fact, for the adaptation threshold reasons indicated earlier, it is essential to supply a minimum volume limit which is reserved for the flow under consideration. This minimum volume will allow, for example, for the baseband to be served with a hierarchical flow, or will be transformed into a guaranteed maximum loss rate in the case of a redundant flow.

The second guarantee relates to the service time. We shall consider below the service time of a packet, which breaks down into a waiting period in the queue and a transmission time on the link, the propagation times and the jitter not being considered. In fact, whether the application obeys an interactivity constraint or not, the receiver(s) must be provided with a reception queue, referred to technically as the "playout buffer", the length of which is determined by the maximum service time which the receivers(s) can achieve. It will be noted that this maximum guaranteed service time relates to all the flow packets, and not to the minimum quantity reserved.

The third guarantee is of a different nature; a user can in fact legitimately demand that his flow should only be subject to degrading if the flows from other users are equally degraded, and in the same proportions. This accordingly constitutes a guarantee which relates to the equability of distribution of resources in the network, a corollary to the homogeneous behavior on the best-effort network, as outlined earlier. In this case, it is the network which undertakes to supply an equitable service, irrespective of the behaviour of the applications, which consequently are not obliged to co-operate.

The objective of the invention is to provide a process which will allow for these three guarantees to be offered. The task is, therefore, to define simultaneously an equability of distribution of the bandwidth which will meet the needs of the adaptive flows, and a fluid model, capable of being approximated by a mechanism which manipulates the packets.

To achieve this, a process of establishing of order of packets according to the invention is of this type which consists of serving, on the output link of a network node, the packets which derive from a multiplicity of input packet flows, a minimum quantity $r_i$ being reserved for each input flow, and a quantity $x_i(t)$ being allocated to each time f for each input flow. It is characterised in that the packets are served in such a way that, at all times, the ratio between the part $\alpha x_i(t)$ to the allocated quantity $x_i(t)$ is above the minimum reserved quantity $r_i$ on the part $e_i(t)$ of the instantaneous quantity $\lambda_i(t)$, with the minimum reserve quantity $r_i$ adopting the same value $K(t)$ at this time for all the flows which are active.

This invention likewise relates to systems provided for the implementation of a process for establishing order according to the invention.

BRIEF DESCRIPTION OF DRAWINGS

The characteristics of the invention indicated above, as well as others, will become clearer on reading the description provided in relation to the appended drawings, where.

DETAILED DESCRIPTION OF THE INVENTION

Figure 1:
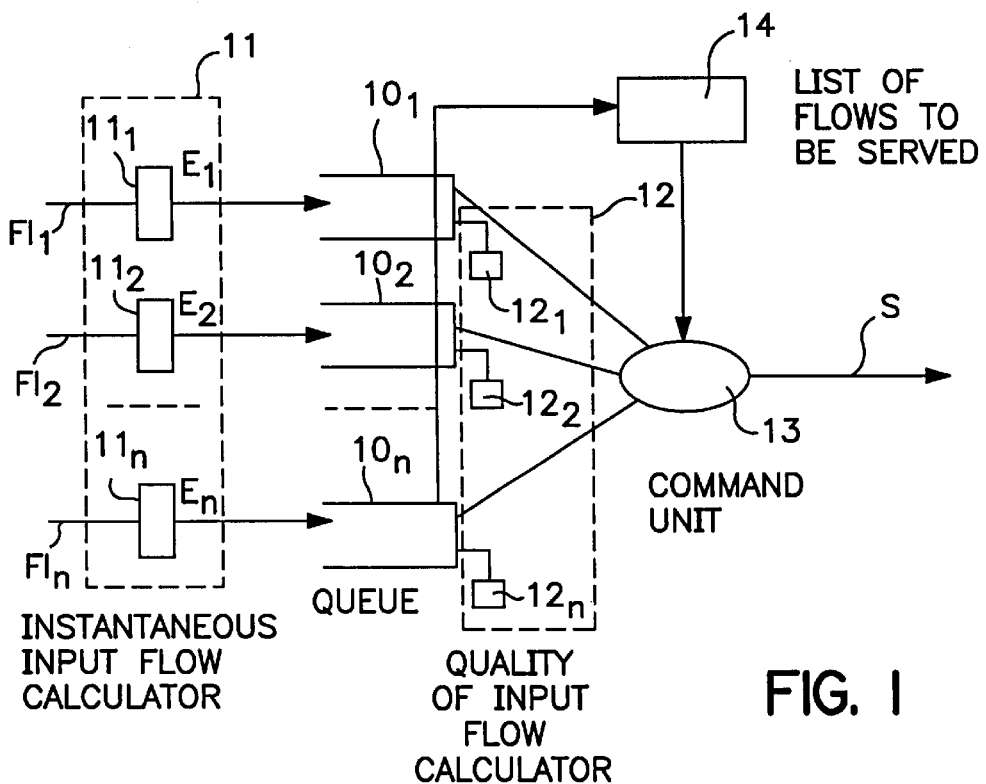
FIG. 1 is a system of establishing of order according to a first embodiment for the implementation of the process of the invention.

To follow the description, the system represented in FIG. 1 will be considered first.

This consists of N input queues $10_1$ to $10_N$, which receive at their respective inputs $E_1$ to $E_N$ active flows $F_1$ to $F_N$. The input queues $10_1$ to $10_N$ are connected to a network node N, the output of which gives onto an output link S of capacity C.

Let $r_1$ to $r_N$ be the minimum reserved quantities at the moment of establishment of the communications which are responsible respectively for the flows $F_1$ to $F_N$, and $\lambda_1(t)$ to $\lambda_N(t)$, the instantaneous quantities effectively submitted to the time t by the flows $F_1$ to $F_N$. It will be considered, on the one hand, that the input queues $10_1$ to $10_N$ have the sizes $B_1$ to $B_N$ respectively, and, on the other, their contents at the moment t are respectively equal to $b_1(t)$ to $b_N(t)$. Accordingly, the reservation which is made at the moment of establishment of each communication corresponds to a "leaky bucket" of parameters $r_i$, $B_i$.

The excess traffic $e_i(t)$ is defined as being the traffic which exceeds the minimum reserved quantity $r_i$ when the corresponding queue $10_i$ is full, in other words, when $b_i(t)=B_i$. It will be noted that $b_i(t)$ is equal to $B_i$ when congestion prevails in the flow $F_i$.

By definition, this excess traffic is therefore equal to $$e_i(t)=\lambda_i(t)-r_i \text{lorsque } b_i(t)=B_1. \tag{4}$$

Likewise, the part $\alpha x_i(t)$ of the allocated quantity $x_i(t)$ at the moment t is defined as being above the reserve quantity $$r_i \alpha x_i(t)=x_i(t)-r_i \tag{5}$$

According to the invention, the packets in the queues $10_1$ to $10_N$ are served on the output link S in such a way that the relationship to the time t of the part $\alpha x_i(t)$ of the allocated quantity $x_i(t)$ above the minimum reserved quantity $r_i$ on the part $e_i(t)$ of the real quantity $\lambda_i(t)$ above the minimum reserve quantity $r_i$ is equal to the same value at this time t for all the active flows $F_i$. This value is annotated as K(t). This characteristic can be represented by the following equation:

$$\forall t, \forall i, \forall j, \frac{\Delta x_i(t)}{e_i(t)} = \frac{\Delta x_j(t)}{e_j(t)} = K(t) \tag{6}$$

It should be recalled that in this equation only the flows $F_1$ to $F_N$ which are active at the moment t are considered; in other words, the flows of which at least one packet is present in the corresponding queue.

It can be shown, by totalling the equation (6) for the different active flows, that the value K(t) is given, at the time t, by the following equation:

$$K(t) = \frac{\left(C - \sum_{j \in \beta(t)} r_j\right)}{\sum_{j \in \beta(t)} e_j(t)} \tag{7}$$

where β(t) is the combination $\{F_1$ to $F_N\}$ of the active flows at the moment t. It can be deduced from this that the instantaneous quantity allocated at the time t to an active flow $F_i$ is given by the following equation:

$$x_i(t) = r_i + K(t) \cdot e_i(t) \tag{8}$$

$$= r_i + \frac{e_i(t)}{\sum_{j \in \beta(t)} e_j(t)} \left(C - \sum_{j \in \beta(t)} r_j\right)$$

It can be shown that for all the flows $F_i$, $F_j$, such that the excess quantities $e_i(t)$ and $e_j(t)$ are positive, i.e. for which the real quantities $\lambda_i(t)$ and $\lambda_j(t)$ respectively subjected to the inputs of the queues $10_i$ and $10_j$, are respectively greater than the minimum reserve quantities $r_i$ and $r_j$, we obtain $$\frac{\lambda_i(t) - x_i(t)}{\lambda_i(t) - r_i} = \frac{\lambda_j(t) - x_j(t)}{\lambda_j(t) - r_j} \tag{9}$$

Each of these quantities represents the rate of loss of traffic in excess for each of the flows $F_i$ and $F_j$. It is therefore shown that the rates of loss of traffic in excess for the flows $F_i$ and $F_j$ are equal. There is accordingly equity of loss.

In addition, if a procedure for the admission of a new communication is implemented, which will only authorise such an admission if the sum of all the minimum reserve quantities $r_i$ is lower than the maximum capacity C of the output link S, i.e. when we have:

$$\sum_{i=1}^{N} r_i \leq C \tag{10}$$

then, for all flows $F_i$, the minimum reserve quantity $r_i$ constitutes a minimum limit to the quantity, and, as a result, the ratio $B_i$ to $r_i$ constitutes a maximum service time limit.

In the specific case in which the minimum reserve quantities are zero, the equation (5) becomes:

$$\Delta x_i(t) = x_i(t) \tag{11}$$

and the equation (6) becomes:

$$\frac{x_i(t)}{x_j(t)} = \frac{\lambda_i(t)}{\lambda_j(t)} \tag{12}$$

which can be rewritten as:

$$\frac{\lambda_i(t) - x_i(t)}{\lambda_i(t)} = \frac{\lambda_j(t) - x_j(t)}{\lambda_j(t)} \tag{13}$$

In other words, an equitable allocation at any moment t results in the balancing of the rates of loss of all the active flows $F_1$ to $F_N$.

It has therefore been shown that a process according to the invention allows for a guaranteed quantity to be obtained which corresponds to the minimum reserve quantity $r_i$, and likewise a guaranteed service time which is accordingly give the $B_i/r_i$. In addition to this, it also allows for equitablility of loss to be guaranteed.

A description will now be provided of how the method disclosed above can be implemented in order to take account of the fact that it must be applied to packets or cells of finite length, which can only be served one after another, and in each case must be served completely.

The system represented in FIG. 1 comprises, for each input $E_k$, a unit $11_k$, which is provided in order to calculate, at each moment t, the value of the value of the instantaneous quantity of the input flow $F_k$(K=1 to N) annotated hereinafter as $\lambda^p{}_k(t)$. This calculation is carried out by an estimation model annotated as P. When a new packet $P^ik$, which is, for example, the first packet of a sequence of a flow $F_k$, is subjected to the system, it is stored in the corresponding queue $10_k$ in the tail end of this queue, at the limit of its capacity.

It is noted that the units $11_k$ can be implemented by means of a single unit 11, as represented by dotted lines in FIG. 1.

At the moment annotated hereinafter by the description $a^1{}_k$, at which a packet arrives, not in the tail end of the queue $10_k$ but at the head of this queue $10_k$, where it is ready to be read and served, a marker of which the value is annotated as $F^i{}_k$ is attached to this packet $p^i{}_k$. This value $F^i{}_k$ is calculated by a unit $12_k$ of the system. The marker $F^i{}_k$ allows for a system for commanding the transmission of the said packet $p^i{}_k$ on the output link S at a moment such that the quantity allocated to the flow $F_k$ conforms with the process according to the invention, and, in particular, conforms to the equation (8) above. This transmission command is effected by a command unit 13 which is common to all the queues $10_1$ to $10_k$.

It is noted that the units $12_k$ can be implemented by means of one single unit 12, as is represented by dotted lines in FIG. 1.

Accordingly, the process for the transmission of a packet p on the output link S is as follows: At a given time t, at the head of each queue $10_k$ (K=1 to N), a packet $p_k$ is stored, to which the corresponding marker $F_k$ is allocated. A unit 14 contains a list of the flows $F_1$ to $F_N$ which are to be served, a list which is sorted by incrementing markers. When a new packet p is to be served on the output link S, the command unit 13 consults the head of the list of the unit 14, which then indicates the next packet to be served, i.e. that of which the marker is the smallest.

An explanation will now be given of the calculation of the marker $F^i{}_k$ which is assigned to the first packet $P^i{}_k$ of a sequence of a flow $F_k$ at its time of arrival $a^i_k$. It will be recalled that the instantaneous quantity of the flow $F_k$ is estimated by a method P and that its value is annotated $\lambda^P_k(t)$.

The value of the quantity in excess of the flow $F_k$ is deducted from the estimated value of the instantaneous quantity $\lambda^P_k(t)$ and is therefore equal to $$\hat{e}^P_k(t) = \left(\hat{\lambda}^P_k(t) - r_k\right) \text{ lorsque } b_i(t) = B_i, \tag{14}$$

The equation (3) is now written $$\frac{\Delta x_i(t)}{\hat{e}^P_i(t)} = \frac{\Delta x_j(t)}{\hat{e}^P_j(t)} = K(t) \tag{15}$$

which applies to all the active flows $F_k$, i.e. to all the flows $F_k$ which at the time t under consideration, confirm the following equation:

$$\hat{\lambda}^P_k(t) > 0 \tag{16}$$

The value of the instantaneous quantity $Q^i_k(t)$ allocated to the time t with a flow $F_k$ is calculated on the basis of the equation (8) and is therefore equal to:

$$\hat{Q}^P_k(t) = r_k + \frac{\hat{e}^P_k(t)}{\sum_{j=1}^{N} \hat{e}^P_k(t)} \cdot \left(C - \sum_{j \in \beta(t)} r_j\right) \tag{17}$$

The value $L'_k$ is noted, the total length of the said packet $p'_k$, $a^i_k$, its moment of arrival i the input queue $10_k$, and $d'_k$, the moment of its complete extraction or the moment of departure from the said queue $10_k$, or the service time. Likewise noted is $b'_k$, the time of the start of the transmission or the service time of the packet $p'_k$.

It is considered that the instantaneous quantity is constant during the transmission of all the bits of the packet $p'_k$, and therefore between the moments $b^i_k$ and $d^i_k$. As it is marked on arrival, i.e. at the time $a^i_k$, it is considered that the instantaneous quantity at a moment t comprised between the time of transmission $b^i_k$ and the time of stoppage $d^i_k$ is equal to the instantaneous quantity at the moment $a^i_k$. Accordingly, $$\hat{\lambda}^P_k(t) = \hat{\lambda}^P_k(a^i_k) \forall\, t \in [b^i_k, d^i_k] \tag{18}$$

Since the minimum reserved quantity $r_k$ for the flow $F_k$ is constant for the whole duration of the communication, it follows that, taking into account equations (14) and (18):

$$\hat{e}^P_k(t) = \hat{e}^P_k(a^i_k) \forall\, t \in [b^i_k, d^i_k] \tag{19}$$

When the packet $p^i_k$ arrives, i.e. at the time $a^i_k$, the estimated value of the instantaneous quantity, annotated as $\lambda^P_j$, of each active flow $F_j$(i={1 N}) other than the flow $F_k$, is in fact that of the instantaneous quantity, annotated this time as $\lambda^P_j(a^1_j)$, of this flow $F_j$ which has been estimated at the time of arrival $a^1_j$ of the packet $p^1_j$, the most recent of the flow $F_j$. Accordingly:

$$\hat{\lambda}^P_j(a^i_k) = \hat{\lambda}^P_j(a^l_j) \tag{20}$$

From the equations (14) and (20), it follows that $$\hat{e}^P_j(t) = \hat{e}^P_j(a^i_k) \forall\, t \in [b^i_k, d^i_k] \tag{21}$$

It can then be easily demonstrated, by substituting in equation (17) the values deduced from the equations (18), (19), and (21), that $$\hat{Q}^p_k(t) = \hat{Q}^p_k(a^i_k) \forall\, t \in [b^i_k, d^i_k] \tag{22}$$

In other words, the quantity allocated to the flow Fk at any time falling within the time interval $[b^i_k, d^i_k]$ has the same value as the quantity allocated to the flow $F_k$ at the time $a^i_l$ The total time taken by the transmission of the packet $p^i_k$ is the ratio of its length $L^i_k$ to the transmission quantity of its bits $Q^i_k$, but it is also the difference between the stopping time $d^i_k$ and the starting time $b^i_k$ of the transmission, that is to say $d^i_k - b^i_k$. Accordingly, $$d^i_k - b^i_k = \frac{L^i_k}{\hat{Q}^P_j(a^i_k)} \tag{23}$$

According to a first embodiment of the invention, a marker is applied to the packet $p^i_k$, the value of the said marker $F^i_k$ corresponds to its theoretical outgoing time from the queue $10_k$, being $F^i_k = d^i_k$.

The packet $p^i_k$ is served at the end of the preceding packet $p^{-1}_k$ of the same flow. In other words, the time for the start of the service $b^i_k$ of the packet $p^i_k$ is equal to the time of the end of the service of the preceding packet $p^{i-1}_k$, i.e. at the time $d^{-1}_k$, which by hypothesis in this embodiment is equal to the marker $F^{-1}_k$ which has been assigned to the packet $p^{-1}_k$. The value of the marker $F^i_k$ can therefore be calculated by the following recurrent formula:

$$F^i_k = \frac{L^i_k}{\hat{Q}^P_j(a^i_k)} + F^{i-1}_k \tag{24}$$

According to a second embodiment of the invention, a marker $F^i_k$ is assigned to the packet $p^i_k$ which will correspond to its complete extraction time from the queue $10_k$, this time being expressed as a virtual time unit defined by a function of virtual time which is annotated v(t) and which, at a time t, corresponds to a virtual time v(t). We accordingly obtain $F^i_k = v(d^i_k)$.

In addition to this, an incrementing string function of virtual time v(t) will be chosen, and the equation (23) above can then be written:

$$v(d^i_k) - v(b^i_k) = \frac{L^i_k}{\hat{Q}^P_j(a^i_k)} \tag{25}$$

Because the packet $p^i_k$ cannot be served before it arrival $a^i_k$ and before the preceding packet $p^{i-1}_k$ of the flow $F_k$ has been completely served. As a result, we derive:

$$b^k_i = \max(a^i_k, d^{i-1}_k) \quad (26)$$

where max (x,y) is the function which, with two values of x and y, corresponds to the greater of the two values.

This relationship is preserved in virtual time, and we can therefore write:

$$v(b^k_i) = \max(v(a^i_k), v(d^{i-1}_k)) \quad (27)$$

We than have:

$$v(d^i_k) = \frac{L^i_k}{\hat{Q}^P_j(a^i_k)} + \max(v(a^i_k), v(d^{i-1}_k)) \quad (28)$$

The marker $F^i_k$ in this second embodiment will therefore be equal to:

$$F^i_k = \frac{L^i_k}{\hat{Q}^P_j(a^i_k)} + \max(v(a^i_k), F^{i-1}_k) \quad (29)$$

It will be noted that if the minimum reserved quantities $r_k$ are zero, the value of the allocated quantity $Q^P_k$ is equal to the value of the instantaneous quantity $\lambda^P_k$. In this case, the last equation becomes:

$$F^i_k = \frac{L^i_k}{\hat{\lambda}^P_j(a^i_k)} + \max(v(a^i_k), F^{i-1}_k) \quad (30)$$

The virtual time function v(t) is not explicit in this case, but it may be identical to that which is used in the establishing of order procedures known by the names WFQ (Weighted Fair Queuing), and SCFQ (Self-Clocked Fair Queuing), described in particular in an article by Hui Zhang entitled "Service Disciplines for Guaranteed Performance Service in Packet-Switching Networks", published in the journal "Proceedings of the IEEE", Vol. 83, No. 10, of October 1995.

It should only be recalled that the normalised estimated service, received by a low $F_k$, is defined in the interval of time comprised between two times $t_1$ and $t_2$ by the following equation:

$$\hat{w}^P_k(t_1, t_2) = \int_{t_1}^{t_2} \frac{x_k(t)}{\hat{Q}^P_k(t)} dt \quad (31)$$

Accordingly, the function of virtual time v(t) is considered, of which the growth between two times $t_2$ and $t_1$ is equal to the estimated normalised service of an active flow $F_k$ during this period of time, being:

$$v(t_2) - v(t_1) = \hat{w}^P_k(t_1, t_2) \quad (32)$$

For a service of a flow $F_k$, the origin of the virtual time v(t)=0 is locate at the time t=0. Accordingly:

$$v(0)=0 \quad (33)$$

It can be shown that the function v(t) this defined is an incrementing string function.

With regard to the method of estimation used in the previous procedure, any method of estimation of quantity based on the observation of the successive arrivals of packets can be used. For example, an exponential weighted mean value can be used (generally known by the name FWMA, Exponential Weighted Moving Average) of parameter k (for example k=0.9), such that the $n^{th}$ estimation $e_n$ may be given by the following equation:

$$e_n = k e_{n-1} + (1-k)E \quad (34)$$

where E is the new value integrated in the estimation. For example, it would be possible to assign to the value E a value defined on the basis of the size of the packet $L^i_k$ and of the time between the arrivals of the present packet and the preceding packet:

$$E = \frac{L^i_k}{a^i_k - a^{i-1}_k} \quad (35)$$

In order to implement the process according to the invention, the system has been considered up to now which is represented in FIG. 1. It is, however, equally possible to use the system which is the object of FIG. 2, and which is now described.

This comprises one single queue 20, of which the output gives onto an output link S. This queue 20 comprises N inputs $E_1$ to $E_N$, supplied respectively by the flows $F_1$ to $F_N$. It likewise comprises, at each input $E_1$ to $E_N$, a unit $21_k$ (k=1 to N), which, at the arrival of a new packet $p^i_k$ from the flow $F_k$ in the system, recalculates by an estimation method P the instantaneous quantity $\lambda^{P_i}_k(t)$ of the flow $F_k$. At each input $E_1$ to $E_N$ provision is likewise made for a unit $22_k$(K=1 to N), which, at the time of arrival $a^i_k$ of the packet $p^i_k$ in the queue 20, carried out the calculation of the value of the marker $F^i_k$ in accordance with the equations given earlier.

Figure 2:
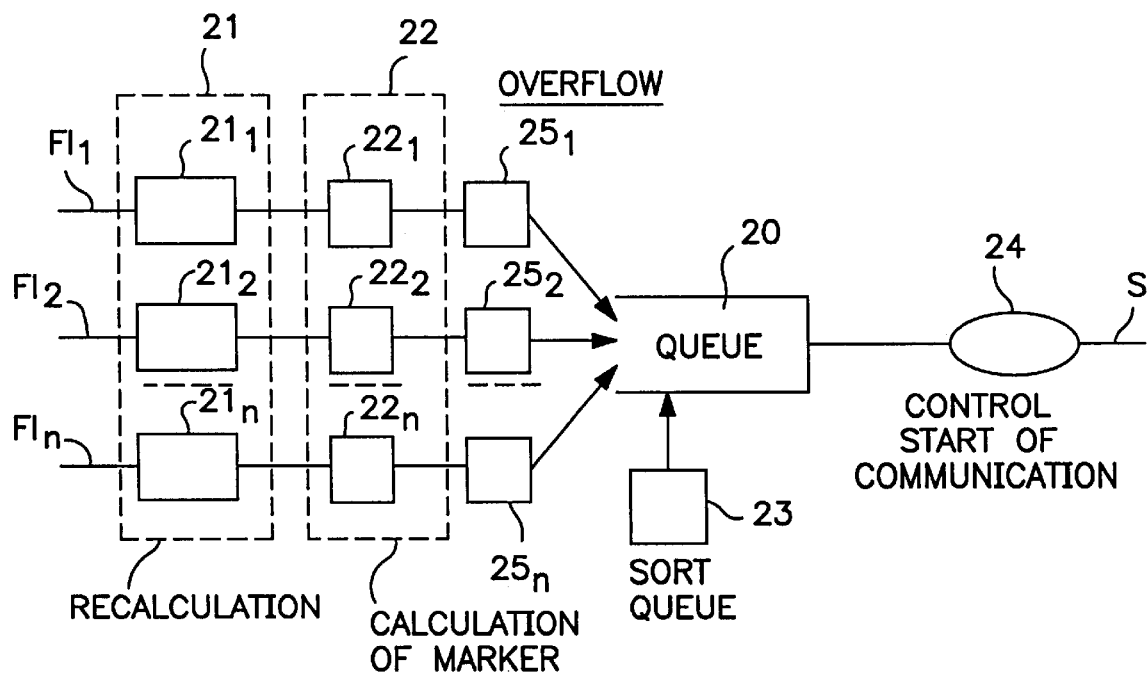
FIG. 2 is such a system according to a second embodiment for the implementation of the process of the invention.

It will be noted that the units $21_k$ can be implemented by means of a single unit 21, as represented by a dotted line in FIG. 2. The same applies with regard to the units $22_k$, which can be implemented by means of a single unit 22 as shown by dotted lines in FIG. 2.

The date of arrival $a^i_k$ of a packet $^i_k$ from a flow $F^k$ is defined as being the moment in real time at which the packet is inserted in the queue 20.

A unit 23 is provided to carry out the sorting of the queue 20 by incrementing markers. Accordingly, the packet which is located at the head of the queue 20 is that to which the smallest marker is allocated.

A unit 24 is provided to control the start of the transmission of the packet present at the head of the queue 20 when the preceding packet has been completely extracted from the queue 20.

Finally, an overflow control device $25_k$ is provided to reject a packet entering from a flow Fk if the number of packets for this flow $F_k$ is greater than a predetermined value, which is equal to $B_k$, making use of the notation given above. It is noted that the queue 10 then functions as N virtual queues of respective capacities $B_1$ to $B_N$, where N is the number of active flows.

What is claimed is:

1. A process establishing an order of outflowing data packets to a network node of output links, said process comprising the steps of:
   (a) receiving a plurality of input data packet flows F from a plurality of input sources;

(b) reserving a minimum quantity $r_i$ of said data packets for each of said plurality of input flows F of data packets;

(c) allocating a quantity $x_i(t)$ of said data packets (d) maintaining at all time a ratio K(t) between two parts of each active one of said input flows F of said data packets, a first of said two parts $\Delta x_i(t)$ being a quantity allocated above the minimum reserve $r_j$, and a second of said two parts $e_i(t)$ being an instantaneous quantity $\lambda_i(t)$ above the minimum reserve quantity $r_i$.

2. A process for establishing an order in accordance with claim 1 wherein a value of the said quantity allocated $Q^P_k(t)$ at the time t to a data packet flow $F_k$, is given by the following equation:

$$\hat{Q}^P_k(t) = r_k + \frac{\hat{e}^P_k(t)}{\sum_{j=1}^{N} \hat{e}^P_j(t)} \left( C - \sum_{j \in \beta(t)} r_j \right)$$

where $r_k$, $r_j$ are respectively minimum quantities reserved for data packet flows $F_k$ and $F_j$, and $e^P_k(t)$ and $e^P_j(t)$ are traffic values in estimated excess, the values of said traffic values being given by the following equations:

$$\hat{e}^P_j(t) = (\hat{\lambda}^P_j(t) - r_k)$$

and $$\hat{e}^P_j(t) = (\hat{\lambda}^P_j(t) - r_j)$$

where C is a maximum quantity on an output link of said node, and 62 (t) is all of the active flows at the moment t{$F_1$ to $F_N$}.

3. A process for establishing an order in accordance with either claim 1 or claim 2 wherein at the time of arrival $a^i_k$ of a first data packet $p^i_k$ in a sequence of packet flows $F_k$ at the network node, a marker $F^i_k$ is allocated to said first data packet $p^i_k$, and the value of the marker $F^i_k$ is used to ensure the service order for said first data packet $p^i_k$ on an output link of the said network.

4. A process for establishing an order in accordance with claim 3 wherein said node serves a plurality of waiting queues $10_1$ to $10_N$, corresponding to the plurality of input data flows, the time of arrival $a^i_k$ of a data packet $p^i_k$, being considered for calculating said marker $F^i_k$, the time of arrival $a^i_k$ being calculated for the data packet $p^i_k$ at the head of the corresponding queue $10_k$.

5. A process for establishing an order in accordance with claim 3 wherein said node serves a single waiting queue 10 which stores the data packets of the said plurality of input flows, the time of arrival $a^i_k$ of a data packet $p^i_k$, being considered for calculating said marker $F^i_k$, the time of arrival $a^i_k$ being calculated for the packet $p^i_k$ in the said queue 10.

6. A process for establishing an order in accordance with claim 3 wherein the value of the marker $F^i_k$ corresponds to its theoretical departure time on an output line of the node.

7. A process for establishing an order in accordance with claim 3, wherein the value of the marker $F^i_k$ is calculated from the following equation:

$$F^i_k = \frac{L^i_k}{\hat{Q}^P_j(a^i_k)} + F^{i-1}_k$$

where $L^i_k$ is a length of the first data packet $p^i_k$ of the data packet flow Fk, $Q^P_{k(a^i_k)}$ is a quantity allocated to the data packet $p^i_k$ at the moment $a^i_k$ of its arrival at the node, and $$F^{i-1}_k$$

is the marker previously allocated to the (i-1)$^{th}$ packet $P^{i-1}_k$ of the data packet flow $F_k$.

8. A process of establishing an order in accordance with claim 3 wherein the value of the marker $F^i_k$ corresponds to its theoretical departure time expressed as virtual time unit defined by a virtual time function, which, at a time t, corresponds to a time of the virtual time v(t).

9. A process of establishing an order in accordance with claim 3 wherein the value of the marker $F^i_k$ is provided by the following equation:

$$F^i_k = \frac{L^i_k}{\hat{Q}^P_j(a^i_k)} + \max(v(a^i_k), F^{i-1}_k)$$

where $L^i_k$ is a length of the first data packet $p^i_k$ of the data packet flow $F_k$, $Q^P_k(a^i_k)$ is a quantity which is allocated to said packet $p^i_k$ at the moment $a^i_k$ of its arrival at the network node; $v(a^i_k)$ is a value adopted as a function of a virtual time at the time of arrival $a^i_k$ of the data packet $p^i_k$ at the network node; and $F^{i-1}_k$ is the marker previously allocated to the (i-1)$^{th}$ packet of the data flow $F_k$, max (x,y) being a function having two values x and y and corresponding to the greater of the two.

10. A process of establishing an order in accordance with claim 7, wherein a method of estimation uses a weighted exponential for parameter k, and the n$^{the}$ estimation $e_n$ may be given by the following equation:

$$e_n = k e_n \; 1 + (1-k) E$$

where E is a value which is integrated in each new estimation.

11. A process for establishing an order of data packets outflowing to a network node of output links, said process comprising the steps of:

(a) receiving a plurality of input data packet flows F from a plurality of input sources;

(b) reserving a minimum quantity $r_i$ of said data packets for each of said plurality of input flows F of data packets;

(c) allocating a quantity $x_i(t)$ of said data packets to each time period (t) for each of said plurality of input flows F of data packets;

(d) maintaining at all time a ration K(t) between two parts of each active one of said input flows F of said data packets, a first of said two parts $\Delta x_i(t)$ being a quantity allocated above the minimum reserve $r_j$, and a second of said two parts $e_i(t)$ being an instantaneous quantity $\mu_i(t)$ above the minimum reserve quantity $r_i$;

wherein a value of the said quantity allocated $Q^P_k(t)$ at the time t to a data packet flow $F_k$, being given by the following equation:

$$\hat{Q}_k^P(t) = r_k + \frac{\hat{e}_k^P(t)}{\sum_{j=1}^{N} \hat{e}_j^P(t)} \left(C - \sum_{j \in \beta(t)} r_j\right)$$

where $r_k$, $r_j$ are respectively minimum quantities reserved for data packet flows $F_k$ and $F_j$, and $e^P_k(t)$ and $e^P_j(t)$ are traffic values in estimated excess, the values of said traffic values being given by the following equations:

$$\hat{e}_j^P(t) = \left(\hat{\lambda}_j^P(t) - r_k\right)$$

and $$\hat{e}_j^P(t) = \left(\hat{\lambda}_j^P(t) - r_j\right)$$

where C is a maximum quantity on an output link of said node, and $\beta(t)$ is all of the active flows at the moment t$\{F_1$ to $F_N\}$;

wherein at the time of arrival $a^i_k$ of a first data packet $p^i_k$ in a sequence of packet flows $F_k$ at the network node, a marker $F^i_k$ is allocated to said first data packet $p^i_k$, the value of the marker $F^i_k$ corresponding to its theoretical departure time on an output line of the node, $F^i_k$ being expressed as a virtual time unit defined by a virtual time function, which, at a time t, corresponds to a time of the virtual time v(t); and the value of the marker $F^i_k$ is used to ensure the service order for said first data packet $p^i_k$ on an output link of the said network; wherein the value of the marker $F^i_k$ is calculated from an equation selected form a group consisting of:

$$F_k^i = \frac{L_k^i}{\hat{Q}_j^P(a_k^i)} + F_k^{i-1}$$

and $$F_k^i = \frac{L_k^i}{\hat{Q}_j^P(a_k^i)} + \max(v(a_k^i), F_k^{i-1})$$

where $L^i_k$ is a length of the first data packet $p^i_k$ of the data packet flow Fk, $Q^P_k(a^i_k)$ is a quantity allocated to the data packet $p^i_k$ at the moment $a^i_k$ of its arrival at the node, and $v(a^i_k)$ is a value adopted as a function of a virtual time at the time of arrival $a^i_k$ of the data packet $p^i_k$ at the network node, and $$F_k^{i-1}$$

is the marker previously allocated to the (i-1)$^{th}$ packet $$p_k^{i-1}$$

of the data packet flow $F_k$, max (x, y) being a function having two values x and y and corresponding to the greater of the two;

wherein said node serves a plurality of waiting queues $10_1$ to $10_N$ which stores the data packets of the said plurality of input flows, corresponding to the plurality of input data flows, the time of arrival $a^i_k$ of a data packet $p^i_k$ being considered for calculating said marker $F^i_k$ the time of arrival $a^i_k$ being calculated for the packet $p^i_k$ at the head of the corresponding queue $10_k$;

wherein said node serves a single waiting queue 10, the time of arrival $a^i_k$ of a data packet $p^i_k$ being considered for calculating said marker $F^i_k$, the time of arrival $a^i_k$ being calculated for the packet $p^i_k$ in the said queue 10.

* * * * *